Aug. 31, 1965   P. A. VESTIN   3,203,735
FLUID OPERATED TILTING DUMP TRUCK STABILIZER
Filed Aug. 3, 1962   2 Sheets-Sheet 1

Aug. 31, 1965   P. A. VESTIN   3,203,735
FLUID OPERATED TILTING DUMP TRUCK STABILIZER
Filed Aug. 3, 1962   2 Sheets-Sheet 2

United States Patent Office 3,203,735
Patented Aug. 31, 1965

3,203,735
FLUID OPERATED TILTING DUMP TRUCK STABILIZER
Petrus August Vestin, Nyland, Sweden
Filed Aug. 3, 1962, Ser. No. 215,223
Claims priority, application Sweden, Aug. 7, 1961,
8,004/61
1 Claim. (Cl. 298—22)

The present invention relates to a method for stabilizing the load-carrying bed of motor vehicles of the type having spring suspension means located between the vehicle frame and the ground wheels, and a means for performing such method.

More particularly, the invention has application to motor vehicles of the truck type, in which the load-carrying bed can be elevated from a substantially horizontal position with respect to the frame, and constituting the transport position to positions allowing the discharge of the load from the bed.

In motor vehicles, especially trucks so constructed so that the bed can be elevated or raised to discharge and which trucks are capable of transporting substantial quantities of material such as gravel, stone, concrete, etc. up to approximately 10 tons, problems and accidents may arise when the load-carrying bed is raised by operation of hydraulic lift units now in common use. When the bed is fully elevated, the bed is supported only at two points by bearings on the frame and by the hydraulic lifting unit, and when the hydraulic lifting unit is in its fully extended position such unit does not afford a particularly stable support. During the unloading of the truck with the bed either partially or fully raised, if the truck should lean or tilt to one side due to the terrain being such that the vehicle wheel sinks in the terrain or for some other reason, this action effects a sidewise shifting of the point of gravity of the load, and a heavy strain on the support points of the bed. This can result in a shift of the load to one side of the bed, and consequently one or both of the anchor points between the bed and the frame could "sag" when the heavy spring action of the main and auxiliary springs of the vehicle becomes effective. This action can readily damage the load-carrying bed, and also frequently lead to the destruction of the driver's cab, and distortion of the frame of the vehicle.

Accordingly, an important object of the present invention is to overcome the above and other objectionable features now present in the art.

Broadly, the invention is directed to motor vehicles wherein the spring system usually located below the truck bed both in the transport position and in the elevated or raised position of the bed is by a locking means attached to the frame and maintained thereby in a compressed position, thus making the spring action of the spring system impossible, regardless of movements of the vehicle such as during its travel and at the discharge or emptying of the truck load with the effect that the bed independent of the position of the load, the amount of the load, the angle of the bed and any possible quick changes of the position of the wheels due to soil penetration or other reasons is maintained stable in that instantaneous straightening or elongating of the compressed spring system is impossible, thereby preventing accidents as well as heavy strains on the vehicle frame and bed.

Further objects and advantages of the invention will become more readily apparent from the following description and annexed drawings, and in which drawings.

Figure 1:
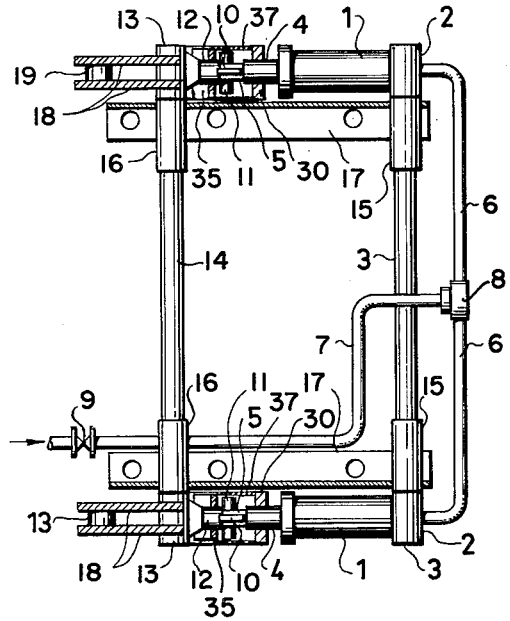
FIG. 1 is a top plan view, partly in cross-section of an apparatus for stabilizing a load carrying bed for a motor vehicle according to the present invention.
Figure 2:
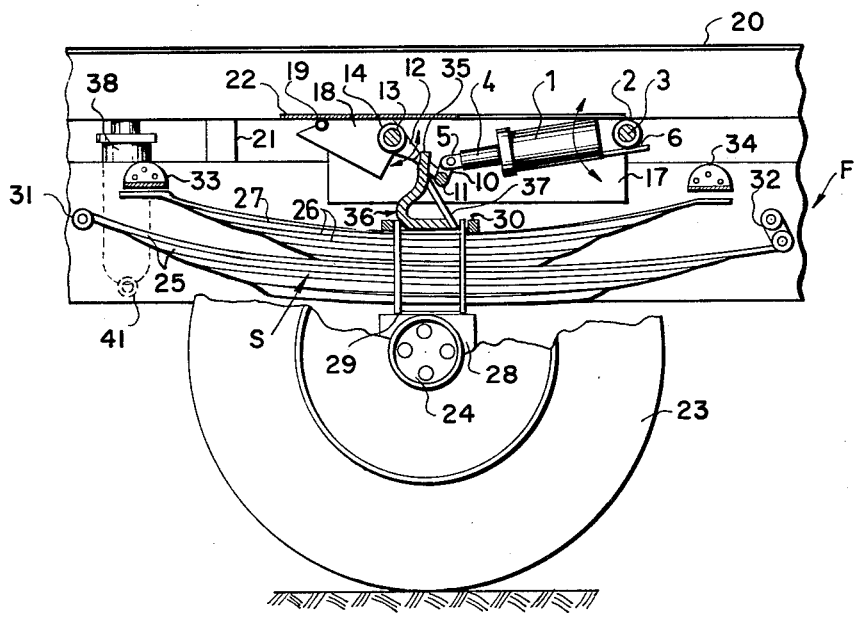
FIG. 2 is a side view, partly in cross-section, of the construction shown in FIG. 1 mounted on the frame of a motor vehicle; and, FIG. 3 is a view similar to FIG. 2, showing the components in locked position during the elevation of the vehicle bed, and with the spring system in the compressed condition.

FIGS. 1 and 2 show a servo-cylinder assembly comprising a pair of cylinders 1 extending axially of the vehicle. Each cylinder is secured to bearing means 2, with each bearing means 2 being rotatable about a shaft 3 extend transversely of vehicle frame F. A piston rod 4 bearing a piston (not shown) is reciprocable in each cylinder 1, and is provided at its outer end with a tapered bifurcation 5. A conduit 6 for a pressure fluid, preferably oil, communicates at each free end thereof with the interior of each cylinder 1, and a second conduit 7 operably connected with the oil pump (not shown) is connected by means of a T-fitting 8 to the conduit 6 intermediate the free ends thereof. A control valve 9 is provided for the conduit 7.

A nose-shaped portion 10 is affixed by welding or the like to a cross member 11 at one end, with the free end of the nose portion being suitably connected in the bifurcation 5. Each cross member 11 is secured to the lower end of a support rod 12, which in turn is attached to bearing means 13 rotatable about a shaft 14, which shaft is arranged in parallelism to the shaft 3. The shafts 3 and 14 are located at a predetermined distance from each other, with shaft 3 being mounted in bearings 15 and shaft 14 in bearings 16. Bearings 16 and 15 are fastened to angle brackets 17 rigidly secured to the frame F by bolts or equivalent means (not shown). The bearing means 13 which are located adjacent each outer end of shaft 14 carry a supporting arm consisting of a pair of parallel plates 18, and a wheel 19 between the plates.

The truck bed 20 is mounted on the frame F for upward and downward pivotal movement, and a support member 21 suitably carried by the bottom portion of the bed 20 cooperates with the frame for determining the position of the bed relative to the frame in the transport position of the bed 20. It will further be noted that each longitudinal extending component of the bed 20 is provided with a wear plate 22 which is adapted to coact with each wheel 19 of the supporting arms, as will later be more fully described.

A wheel assembly 23, preferably of the type having a pneumatic tire is mounted on axle 24. A spring system S including a main leaf spring 25 and an auxiliary leaf spring 26, 27 is suitably associated with the housing for the axle 24. More particularly, a casing 28 is mounted on the axle housing, and a pair of U-shaped connectors 29 extend over a disc-like component 30 positioned above the auxiliary springs 26, 27, with the free legs of the U-shaped connectors being suitably affixed to the casing 28. The disc 30 is provided with raised portions 31 on its upper face for preventing the connectors 29 from being dislodged from the disc. The uppermost leaf of the main spring 25 is rigidly connected to frame F at one end thereof, as indicated at 31, while the other end of such leaf is connected to the frame by a displaceable means 32, with such respective connections being of conventional type. The uppermost leaf spring of the auxiliary assembly 26, 27 is adapted at its ends thereof to coact with supports 33 and 34 fastly connected to the frame F. It will be appreciated that when the bed is loaded, the springs will assume the position shown in FIGURE 3, whereas when the vehicle is unloaded, the spring assembly assumes the relationship depicted in FIGURE 2.

Figure 3:
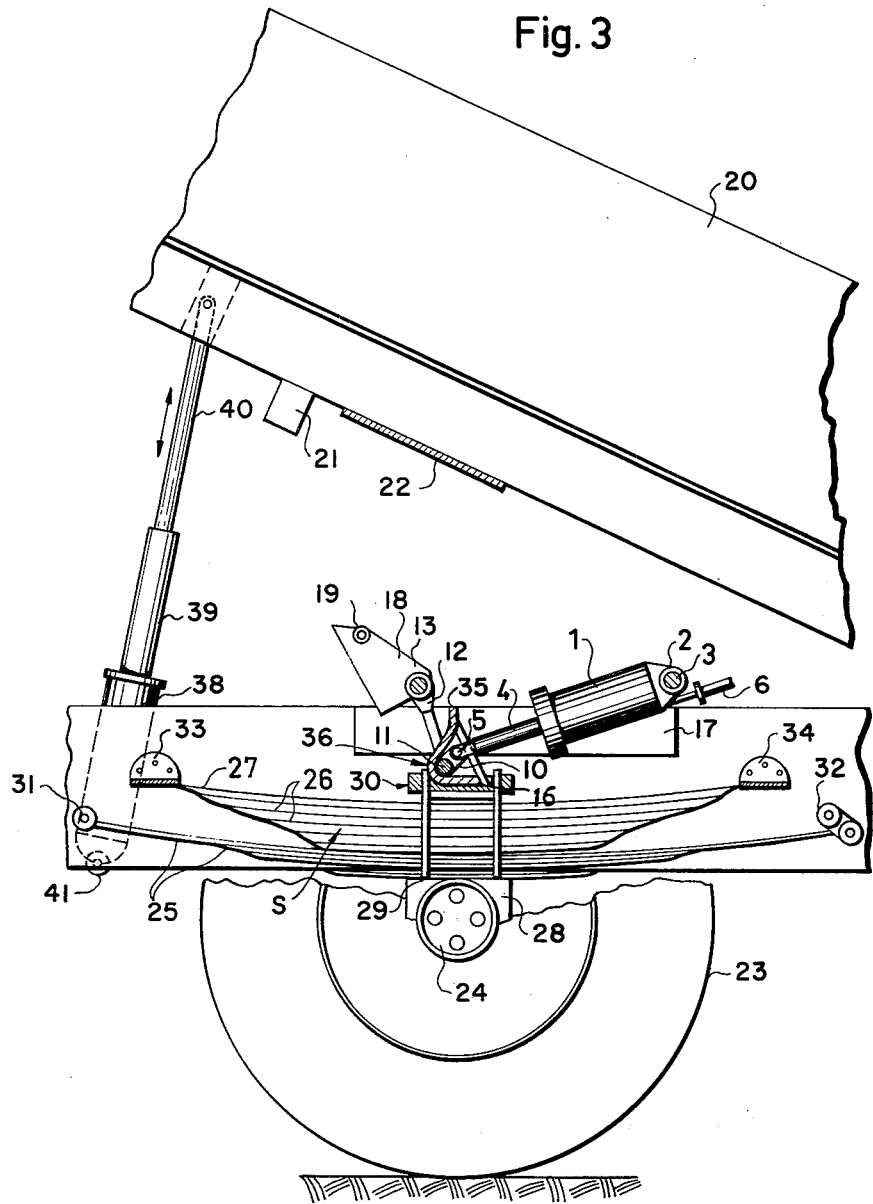

As pointed out hereinabove, a salient object of the present invention is to provide means for locking the spring assembly in the loaded condition, namely, the position illustrated in FIGURE 3. To accomplish this end, it will be noted that there is provided a locking component 35 for each of said cylinders 1, and each locking component 35 is substantially L-shaped, with such component being provided with a rounded portion 36 adjacent the juncture of the vertical and horizontal legs of the component. The horizontal leg of the component 35 is carried by the disc 30. Each locking component 35 has associated therewith a brace means 37 which serves to prevent deformation of the vertical leg of the component 35. As shown in FIG. 1, the brace means are so placed and spaced from each other that the cross member 11 can freely pass therebetween. In order to elevate the bed 20 relative to the frame F, there is provided a telescopic lifting means including cylinder 38 and rods 39 and 40, with rod 40 being connected to the bed, and with the cylinder 38 being pivotally connected to the frame F at 41.

The elevating apparatus 38, 39 and 40 may be actuated by conduit means leading between the cylinder 38 and the oil pump of the vehicle. While the operation of the invention is believed to be apparent from the above-entitled description, it may be briefly summarized as follows.

When the vehicle is not loaded, the locking component 35 is in the position illustrated in FIGURE 2, with the spring system being at a maximum distance from the frame F. When the bed 20 is loaded, (FIG. 3), and the valve 9 is manipulated to admit oil into the cylinders 1, the piston rods 4 will be extended so that the cross members 11 will be displaced to the left (FIG. 2), thus deflecting the braces 37 and components 35 to permit the cross members 11 to ride down the surface of the components 35, and ultimately enter rounded portions 36, whereupon the spring assembly will be locked in the compressed position until the load has been discharged from the bed 20.

When the load has been discharged, and the bed is moved toward the frame F, the wear plates 22 engage the wheels 19 of the supporting arms, thus rocking the supporting arms in a counterclockwise direction, and with the valve 9 being manipulated so as to bleed the oil out of the cylinders 1, the piston rods 4 and associated components will be moved into the position illustrated in FIGURE 2, with such components remaining in this relationship until the bed 20 is again loaded and oil admitted into the cylinders 1 to extend the piston rods 4. Alternatively, the locking action can be accomplished when oil is introduced into the cylinder 38 by operation of the pump for elevating the bed 20.

The invention is not to be confined to any strict conformity to showings in the drawings but changes or modifications may be made therein so long as such changes or modifications mark no material departure from the spirit and scope of the appended claims.

I, therefore, claim:

In an apparatus for stabilizing a bed for carrying a load on a motor vehicle of the type including a frame, a pair of ground wheels, leaf spring means between the frame and each of the ground wheels, means for mounting the bed for raising and lowering movement relative to the frame, means for locking each leaf spring means in compressed condition, means for preventing the locking of the leaf spring means when the carrying bed is in its lowered position on the frame and for restoring the locking means to the unlocked position upon lowering of the bed to the frame, said locking means comprising a pair of cylinders swingably mounted on the frame, a piston carrying rod in each cylinder, a pair of support rods swingably mounted on the frame, each of said piston carrying rods and support rods having a free end, a cross member operably connected to the free end of each piston carrying rod and connecting such free end to the free end of the support rod, a pair of substantially L-shaped locking components carried by the respective leaf spring means with the horizontal leg facing the cross member, each of said locking components adjacent the juncture between the horizontal and vertical legs having an arcuate portion for receiving the cross member, means for introducing fluid pressure into the cylinders for extending the piston carrying rods and forcing the cross members into engagement with each of the locking components at the arcuate portion thereof for locking the respective leaf spring means in the compressed condition, each of said support rods being provided with a further member connected to means carried by the bed and operative on lowering of the bed to the frame to swing said support rods in the direction of said cylinders to force each piston carrying rod back into its cylinder thereby disengaging each of the cross members from the arcuate portion of the locking components and said further member and said means carried by the bed being operably connected to each other so that said locking means are rendered inoperable unless the bed is raised a predetermined amount above the frame.

References Cited by the Examiner

UNITED STATES PATENTS

| | | | |
|---|---|---|---|
| 1,581,358 | 4/26 | Mayer | 182—127 |
| 1,610,881 | 12/26 | Reinsch | 298—17 |
| 1,690,040 | 10/28 | Sosdian | 254—133 |
| 2,438,571 | 3/48 | Maxon, Jr. | 280—43 |
| 2,556,610 | 6/51 | Biszantz | 298—17 |
| 2,662,780 | 12/53 | Talbert | 280—104.5 |
| 2,777,529 | 1/57 | Harbers | 298—15 |
| 2,997,342 | 8/61 | Talbert | 298—17 |
| 2,999,721 | 9/61 | Wood | 298—17 |

ARTHUR L. LA POINT, *Primary Examiner.*

JAMES S. SHANK, LEO QUACKENBUSH, MILTON BUCHLER, *Examiners.*